US010923938B2

(12) United States Patent
Yang et al.

(10) Patent No.: US 10,923,938 B2
(45) Date of Patent: Feb. 16, 2021

(54) CHARGING DEVICE AND CHARGING METHOD

(71) Applicant: Nanjing Chervon Industry Co., Ltd., Nanjing (CN)

(72) Inventors: Dezhong Yang, Nanjing (CN); Yingdian Xiang, Nanjing (CN); Hong Zhu, Nanjing (CN); Zhijian Lu, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 62 days.

(21) Appl. No.: 16/014,603

(22) Filed: Jun. 21, 2018

(65) Prior Publication Data

US 2019/0044364 A1 Feb. 7, 2019

(30) Foreign Application Priority Data

Aug. 3, 2017 (CN) .......................... 2017 1 0654317

(51) Int. Cl.
*H02J 7/00* (2006.01)
*H02J 7/14* (2006.01)
*H02J 7/02* (2016.01)
*H02M 7/04* (2006.01)
*H01M 10/44* (2006.01)
*H02M 3/00* (2006.01)
*H02J 7/04* (2006.01)

(52) U.S. Cl.
CPC ........... *H02J 7/022* (2013.01); *H01M 10/441* (2013.01); *H02J 7/045* (2013.01); *H02M 3/00* (2013.01); *H02M 7/043* (2013.01); *H02J 7/00* (2013.01); *H02J 2207/20* (2020.01)

(58) Field of Classification Search
USPC ......................................................... 320/128
See application file for complete search history.

(56) References Cited

U.S. PATENT DOCUMENTS 10,447,090 B1 * 10/2019 Abdolkhani ............ H01F 38/14
2002/0060552 A1 * 5/2002 Harada .................. H02J 7/0003
320/106

(Continued)

FOREIGN PATENT DOCUMENTS

CN 101104219 A 1/2008

*Primary Examiner* — Alexis B Pacheco
(74) *Attorney, Agent, or Firm* — Greenberg Traurig, LLP

(57) ABSTRACT

A charging device for charging an electric energy storage device includes a power supply circuit connected to a power supply, an alternating current conversion circuit configured to convert a current from the power supply connected to the power supply circuit to a first alternating current with a preset frequency value, a transformer configured to convert the first alternating current to a second alternating current, wherein a voltage value corresponding to the second alternating current being less than a voltage value corresponding to the first alternating current, and a direct current voltage conversion circuit configured to convert the second alternating current to a direct current with a waveform fluctuating in a preset range, so as to charge an electric energy storage device. The alternating current conversion circuit is connected to the power supply circuit, the transformer is connected to the alternating current conversion circuit, and the direct current voltage conversion circuit is connected to the transformer.

7 Claims, 7 Drawing Sheets

(56) References Cited

U.S. PATENT DOCUMENTS

| | | | |
|---|---|---|---|
| 2008/0101096 A1* | 5/2008 | Takayanagi | B60L 1/003 363/17 |
| 2008/0290835 A1* | 11/2008 | Hayashi | H01M 2/1022 320/112 |
| 2013/0063079 A1* | 3/2013 | Kawai | H02J 7/045 320/107 |
| 2013/0113439 A1* | 5/2013 | Mack | H01M 10/0525 320/163 |
| 2013/0221903 A1* | 8/2013 | Hwang | H02J 7/045 320/107 |

* cited by examiner

CHARGING DEVICE AND CHARGING METHOD

RELATED APPLICATION INFORMATION

This application claims the benefit of CN 201710654317.0, filed on Aug. 3, 2017, the disclosure of which is incorporated herein by reference in its entirety.

TECHNICAL FIELD

The present disclosure relates to a charging device, and in particular, relates to a charging device for charging an electric energy storage device.

BACKGROUND

The existing charging devices, which are used for charging an electric energy storage device, such as a battery pack, usually use a large electrolytic capacitor to smooth the voltage from the power grid to which the charging devices are connected and to charge the battery pack with the smooth direct current.

On the one hand, the large electrolytic capacitor ages easily with the increase of the current load and the number of use, and has a short service life. Therefore, the service life of the charging device is affected. On the other hand, the high cost of the large electrolytic capacitor leads to the high cost of the charging device.

SUMMARY

In order to solve the deficiencies in the related art, the object of the present disclosure is to provide a charging device with a long service life and a low cost.

In order to achieve the above object, the present disclosure adopts the following technical solutions.

A charging device for charging an electric energy storage device includes a power supply circuit connected to a power supply, an alternating current conversion circuit configured to convert a current from the power supply connected to the power supply circuit to a first alternating current with a preset frequency value, a transformer configured to convert the first alternating current to a second alternating current, wherein a voltage value corresponding to the second alternating current is less than a voltage value corresponding to the first alternating current, and a direct current voltage conversion circuit configured to convert the second alternating current to a direct current with a waveform fluctuating in a preset range, so as to charge the electric energy storage device. The alternating current conversion circuit is connected to the power supply circuit, the transformer is connected to the alternating current conversion circuit, and the direct current voltage conversion circuit is connected to the transformer.

Further, the alternating current conversion circuit may include a switching arrangement configured to switch on and switch off a connection between the power supply circuit and the alternating current conversion circuit and a controller configured to control a frequency of the switch-on and switch-off of the switching arrangement, so as to convert the current from the power supply connected to the power supply circuit to the first alternating current with the preset frequency value.

Further, the charging device may also include a detection module configured to detect an output current of the direct current voltage conversion circuit and a controller configured to output a control signal with a constant duty cycle to the switching arrangement when the output current reaches a preset current value.

Further, the charging device may also include a detection module configured to detect an output current of the direct current voltage conversion circuit and a controller configured to output a control signal with a varying duty cycle to the switching arrangement according to a variation in the output current, so as to maintain the output current at a preset value.

Further, the direct current voltage conversion circuit may include a rectifier unit configured to convert the second alternating current to a pulsating direct current and a filter circuit configured to convert the pulsating direct current to a smooth direct current, so as to charge the electric energy storage device.

Further, the alternating current conversion circuit may include a switching arrangement configured to switch on a connection between the power supply circuit and the alternating current conversion circuit and a capacitor configured to constitute a current loop with the switching arrangement and the transformer during the switch-on of the switching arrangement.

Further, the current from the power supply connected to the power supply circuit may be an alternating current.

Further, the transformer may be a high-frequency transformer with the high frequency range being from 5 kHz to 1 MHz.

A method for charging an electric energy storage device includes detecting an effective charging current value, comparing the effective charging current value with a preset reference current value, when the effective charging current value is larger than the preset reference current value, decreasing a duty cycle, and when the effective charging current value is less than the preset reference current value, increasing the duty cycle.

A method for charging an electric energy storage device includes detecting an effective charging current peak, comparing the effective charging current peak with a preset reference current peak, when the effective charging current peak is larger than the preset reference current peak, decreasing a duty cycle, and when the effective charging current peak is less than the preset reference current peak, increasing the duty cycle.

The present disclosure has advantages of providing a charging device and a charging method with low cost, long service life, and high charging efficiency.

DETAILED DESCRIPTION

The present disclosure is described below in detail with reference to the accompanying drawings and specific examples.

Figure 1:
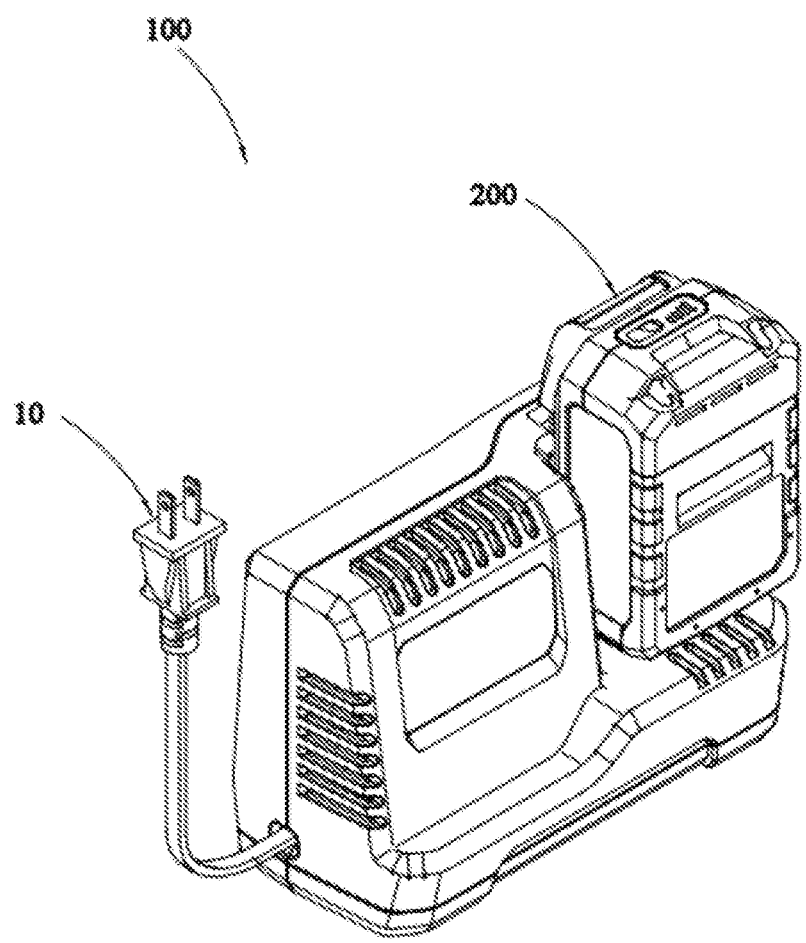
FIG. 1 is a structure diagram of an exemplary charging device.

FIG. 1 exemplarily illustrates a structure diagram of a charging device 100. A battery pack 200 is detachably connected to the charging device 100, and is connected to an external power supply through the charging device 100 to charge the battery pack 200. The charging device 100 includes an alternating current plug 10 connected to an alternating current mains supply. The current coming from the alternating current mains supply is converted to a direct current by a charging circuit 120 in the charging device 100 to charge the battery pack 200.

Figure 2:
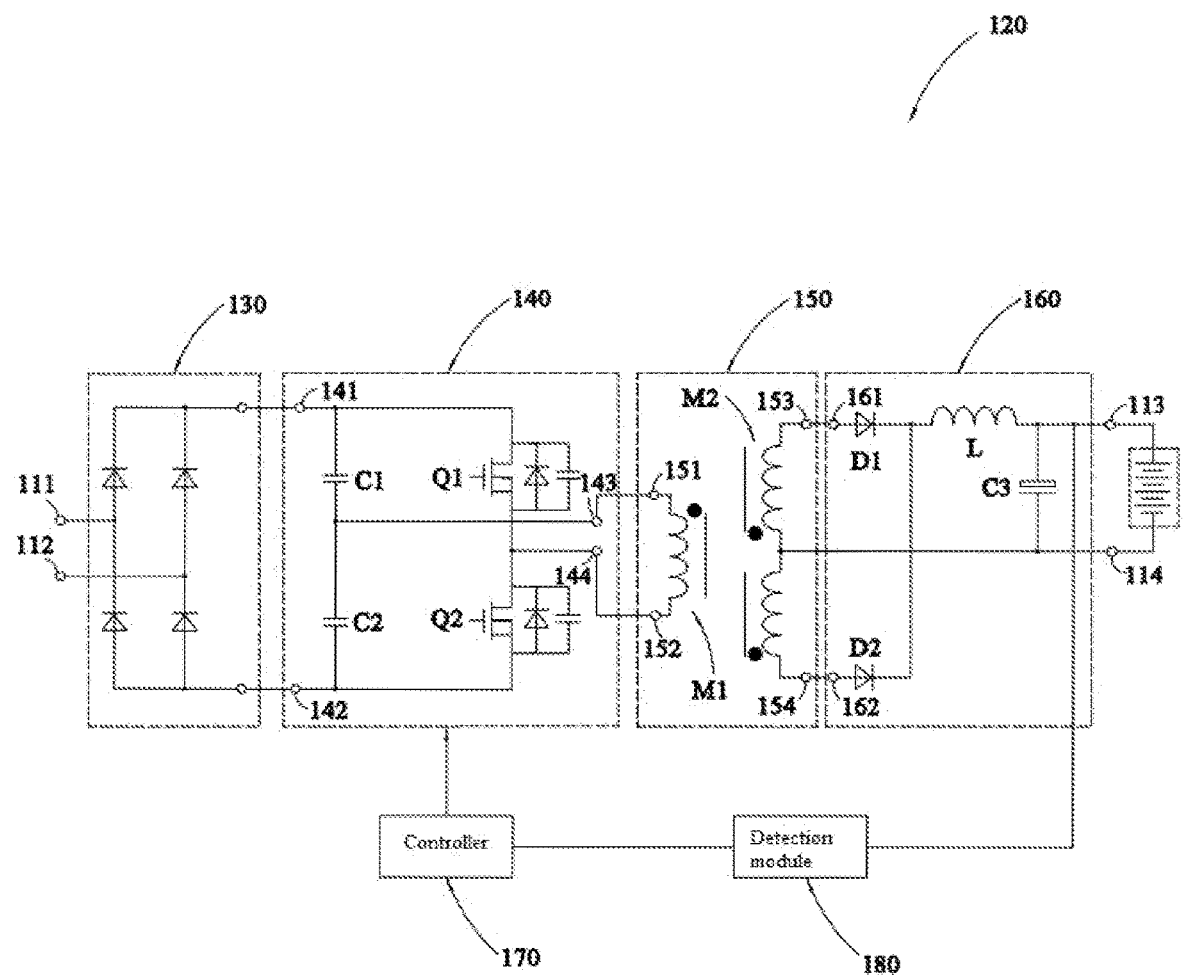
FIG. 2 is a diagram of an exemplary charging circuit.

The charging circuit 120 illustrated in FIG. 2 includes a power supply circuit 130, an alternating circuit conversion circuit 140, a transformer 150 and a direct current voltage conversion circuit 160.

The charging device 100 includes a first access terminal 111 and a second access terminal 112. The first access terminal 111 and the second access terminal 112 constitute an input end of the charging device 100. The charging device 100 further includes a first outlet terminal 113 and a second outlet terminal 114. The first outlet terminal 113 and the second outlet terminal 114 constitute an output end of the charging device 100. The first access terminal 111 and the second access terminal 112 are connected to an alternating current voltage source, and the input alternating current voltage is loaded between the first access terminal 111 and the second access terminal 112. Specifically, the input alternating current voltage is the voltage of a power grid. The first access terminal 111 and the second access terminal 112 are respectively connected to the alternating current plug 110. An input current is supplied to the charging device 100 through the first access terminal 111 and the second access terminal 112, and the input current is a sinusoidal alternating current.

The first outlet terminal 113 and the second outlet terminal 114 are connected to the electric energy storage device or the battery pack 200 which needs to be charged, so as to charge the electric energy storage device or the battery pack 200 accordingly.

The first access terminal 111 and the second access terminal 112 are connected to the power supply circuit 130, and the power supply circuit 130 is connected to a first alternating current access terminal 141 and a second alternating current access terminal 142 at the output side of the power supply circuit 130. The alternating current voltage loaded between the first access terminal 111 and the second access terminal 112 is rectified by the power supply circuit 130 and converted to a unidirectional pulsating direct current voltage. The power supply circuit 130 outputs the pulsating direct current voltage at the output side. That is, the unidirectional pulsating direct current voltage is loaded between the first alternating current access terminal 141 and the second alternating current access terminal 142. The power supply circuit 130 is a bridge rectifier circuit, a half-wave rectifier circuit, or a full wave rectifier circuit. The power supply circuit 130 in the example is a bridge rectifier circuit.

The charging device 100 further includes an alternating current conversion circuit 140 and a controller 170. The alternating current conversion circuit 140 includes the first alternating current access terminal 141 and the second alternating current access terminal 142. The first alternating current access terminal 141 and the second alternating current access terminal 142, serving as the input side of the alternating current conversion circuit 140, are connected to the output side of the power supply circuit 130. The alternating current conversion circuit 140 further includes a first alternating current outlet terminal 143 and a second alternating current outlet terminal 144. The first alternating current outlet terminal 143 and the second alternating current outlet terminal 144, serving as the output side of the alternating current conversion circuit 140, output a first alternating current with a preset frequency value. The alternating current conversion circuit 140, under the control of a controller 170, converts the unidirectional pulsating direct current loaded between the first alternating current access terminal 141 and the second alternating current access terminal 142 to the first alternating current with a preset frequency value.

Specifically, the alternating current conversion circuit 140 includes a first capacitor C1, a second capacitor C2, a first semiconductor switch Q1 and a second semiconductor switch Q2. One terminal of the first capacitor C1 is connected to the first alternating current access terminal 141. The other terminal of the first capacitor C1 is connected to one terminal of the second capacitor C2. The other end of the second capacitor C2 is connected to the second alternating current access terminal 142. A first terminal of the first semiconductor switch Q1 is connected to the first alternating current access terminal 141. A second terminal of the first semiconductor switch Q1 is connected to a first terminal of the second semiconductor switch Q2. A second terminal of the second semiconductor switch Q2 is connected to the second alternating current access terminal 142. The first alternating current outlet terminal 143 is connected to a node between the first capacitor C1 and the second capacitor C2 and the second alternating current outlet terminal 144 is connected to a node between the second terminal of the first semiconductor switch Q1 and the first terminal of the second semiconductor switch Q2. Each of the first semiconductor switch Q1 and the second semiconductor switch Q2 has a third terminal configured to receive the control signal from the controller 170. The controller 170 sends a control signal to switch on one of the first semiconductor switch Q1 and the second semiconductor switch Q2 and switch off the other one. As such, the alternating current conversion circuit 140 converts the unidirectional pulsating direct current voltage to the first alternating current with the preset frequency value. The first semiconductor switch Q1 and the second semiconductor switch Q2 are MOSFETs or IGBTs.

Specifically, the controller 170 first sends a first control signal to switch on the first semiconductor switch Q1 and switch off the second semiconductor switch Q2, and then sends a second control signal to switch off the first semiconductor switch Q1 and switch on the second semiconductor switch Q2. The controller 170 alternately sends the first control signal and the second control signal to convert the pulse power supply to the first alternating current.

Figure 3:
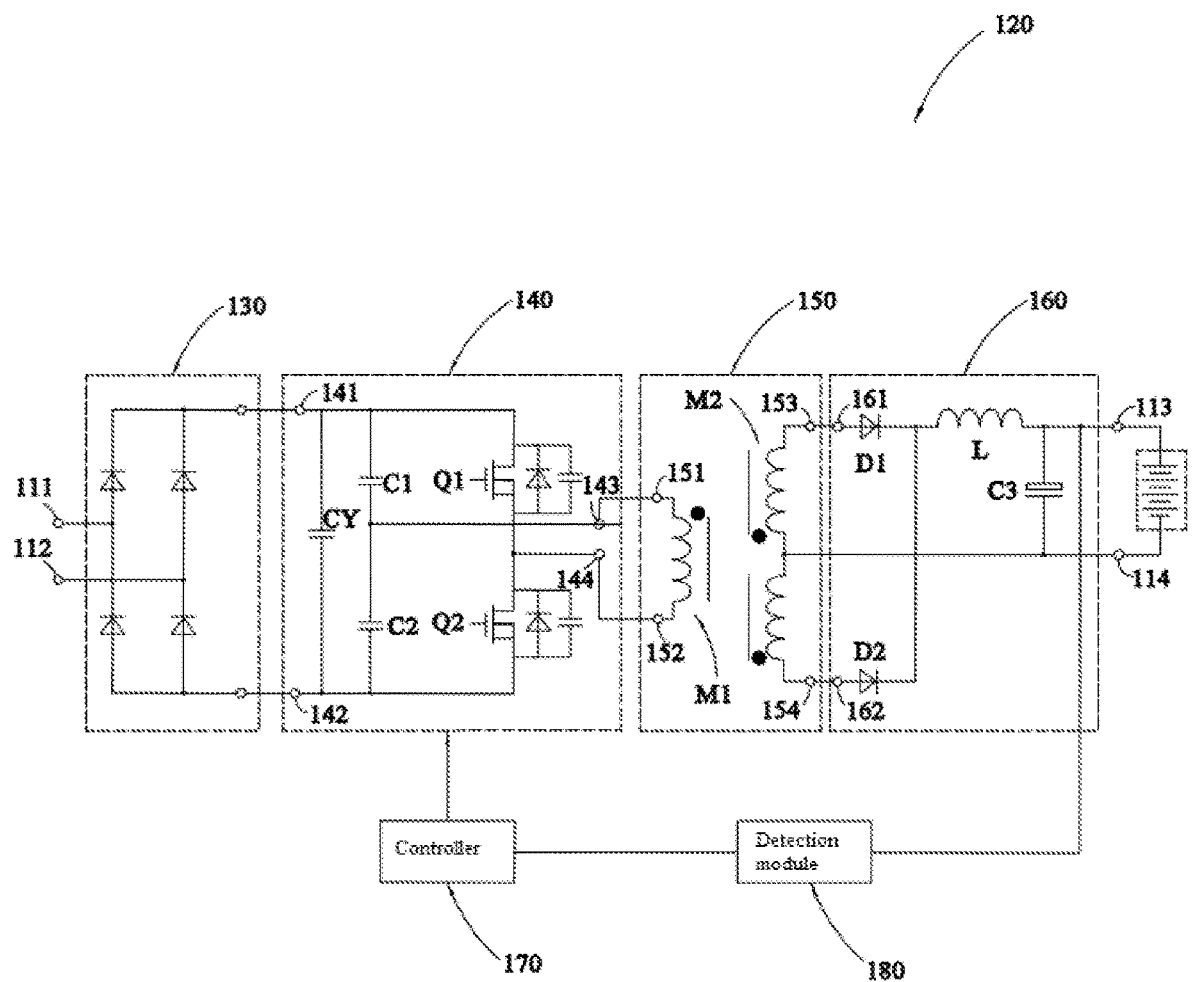
FIG. 3 is a diagram of a further exemplary charging circuit.

In the example illustrated in FIG. 3, a small electrolytic capacitor CY is connected between the power supply circuit 130 and the alternating current voltage conversion circuit 140. The value range of the small electrolytic capacitor CY is 330 nF<CY<(0.5*output power) nF, and the output power here refers to the output power of the charging device. For example, if the output power of the charging device is 45 W, the value of the small electrolytic capacitor ranges from 330 nF to 22.5 nF.

Compared with an existing charging device, the difference is that there is no need to use a large electrolytic capacitor with a short service life and a large volume between the power supply circuit 130 and the alternating current voltage conversion circuit, which reduces the cost of production and makes the charging device 100 more compact.

The charging device 100 also includes a transformer 150. The transformer 150 includes a primary coil M1 and a secondary coil M2. The primary coil M1 includes a first primary terminal 151 and a second primary terminal 152. The first primary terminal 151 is connected to the first alternating current outlet terminal 143, and the second primary terminal 152 is connected to the second alternating current outlet terminal 144. That is, the first alternating current is loaded between the first primary terminal 151 and the second primary terminal 152. The secondary coil M2 includes a first secondary terminal 153 and a second secondary terminal 154. The first secondary terminal 153 and the second secondary terminal 154, serving as the output side of the transformer 150, are connected to an alternating current voltage conversion circuit 160. The transformer 150 is configured to convert the first alternating current to the second alternating current. The voltage value corresponding to the second alternating current is less than the voltage value corresponding to the first alternating current. Specifically, the transformer 150 has two secondary coils M2, which are connected with each other head-to-tail. Specifically, the transformer 150 is an electronic isolation transformer.

The charging device 100 also includes the direct current voltage conversion circuit 160. The direct current voltage conversion circuit 160 includes a first direct current access terminal 161 and a second direct current access terminal 162. The first direct current access terminal 161 is connected to the first secondary terminal 153, and the second direct current access terminal 162 is connected to the second secondary terminal 154. That is, the second alternating current is loaded between the first direct current access terminal 161 and the second direct current access terminal 162. Specifically, the direct current voltage conversion circuit 160 includes a filter circuit and a rectifier unit. The rectifier unit consists of a first diode D1 and a second diode D2. The filter circuit includes an inductor L and a third capacitor C3. The anode of the first diode D1 is connected to the first secondary terminal 153. The cathode of the first diode D1 is connected to one terminal of the inductor L. The other terminal of the inductor L is connected to the first outlet terminal 113. The anode of the second diode D2 is connected to the second secondary terminal 154 and the cathode of the first diode D2 is connected to one terminal of the inductor L. One terminal of the third capacitor C3 is connected to the other terminal of the capacitor L and the other terminal of the third capacitor C3 is connected to a node between two primary coils M2. That is, the other terminal of the third capacitor C3 is connected to the second outlet terminal 114. The second alternating current is filtered by the unidirectional conduction characteristic of the first diode D1 and the second diode D2, and the filter circuit consisting of the inductor L and the third capacitor C3 enables the second alternating current to be filtered, such that the first outlet terminal 113 and the second outlet terminal 114 output a direct current voltage with a fluctuating waveform to charge the battery pack 200.

Figure 4:
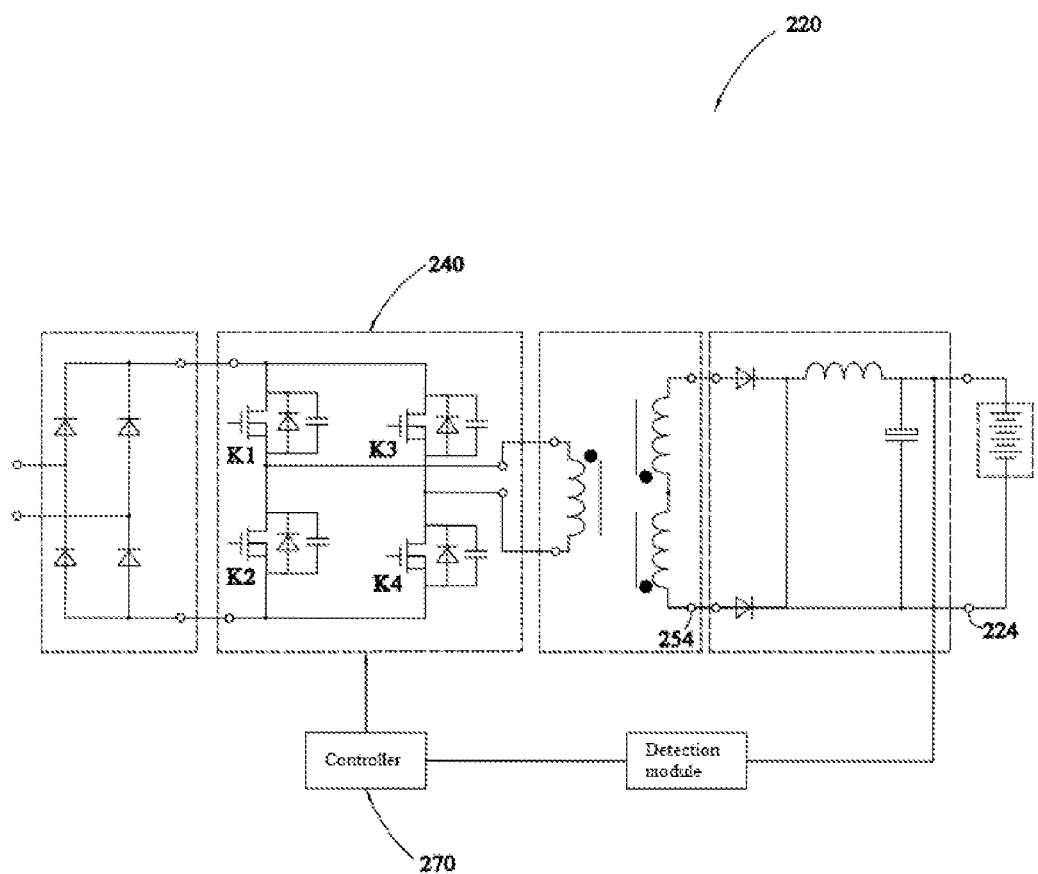
FIG. 4 is a diagram of a still further exemplary charging circuit.
Figure 5:
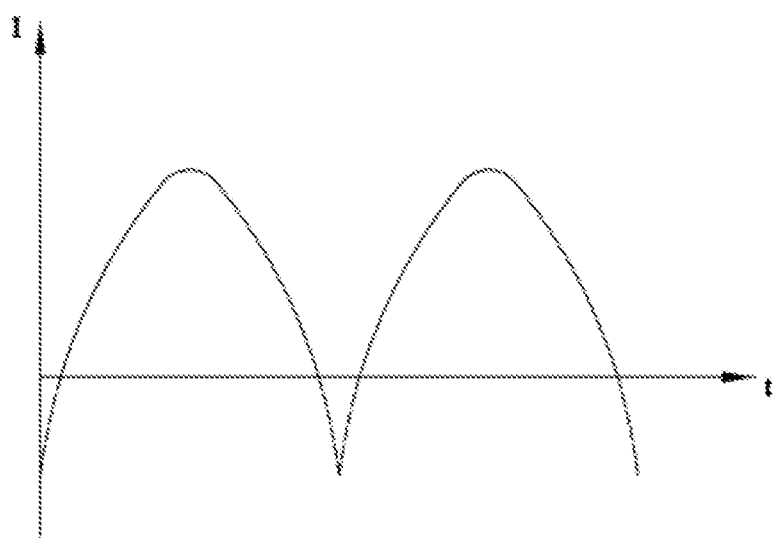
FIG. 5 is an output waveform diagram of an exemplary direct current voltage conversion circuit in a charging circuit.

It should be illustrated that the direct current with a fluctuating waveform here indicates that the waveform of the direct current output by the first outlet terminal 113 and the second outlet terminal 114 is a waveform which fluctuates within a preset range, such as a sinusoidal half-wave waveform or a direct current waveform illustrated in FIG. 4.

Because the voltage of the battery pack 200 is set with respect to the battery pack 200 in advance, the output voltage between the first outlet terminal 113 and the second outlet terminal 114 remains substantially stable, while the output current is variable. Therefore, the output power, which is output to the battery pack 200 by the charging device 100, can be dynamically adjusted by adjusting the output current of the direct current voltage conversion circuit 160.

The charging device 100 includes a detection module 180. The detection module 180 is connected to a node between the inductor L and the first outlet terminal 113, and is configured to detect the output current of the charging circuit 120. The controller 170 outputs a corresponding control signal to the first semiconductor switch Q1 and the second semiconductor switch Q2 according to the output current detected by the detection module 180. Alternatively, the detection module 180 may be connected to the battery pack 200 to detect the charging current for the battery pack 200. The controller 170 outputs a corresponding control signal according to the charging current detected by the detection module 180 to switch on or switch off the first semiconductor switch Q1 and the second semiconductor switch Q2.

In one embodiment of the present disclosure, the detection module 180 collects the charging current. The controller 170 presets an allowable charging current reference value. The controller 170 receives the effective charging current value collected by the detection module 180, and compares the effective charging current value collected by the detection module 180 with the preset charging current reference value, so as to compensate, rectify and output the control signal with a constant duty cycle to the first semiconductor switch Q1 and the second semiconductor switch Q2. Specifically, the controller 170 simultaneously outputs a control signal to switch on the first semiconductor switch Q1 and switch off the second semiconductor switch Q2. The frequency of the switch-on and switch off of the first semiconductor switch Q1 is controlled in a manner of pulse width modulation with a constant duty cycle.

Figure 6:
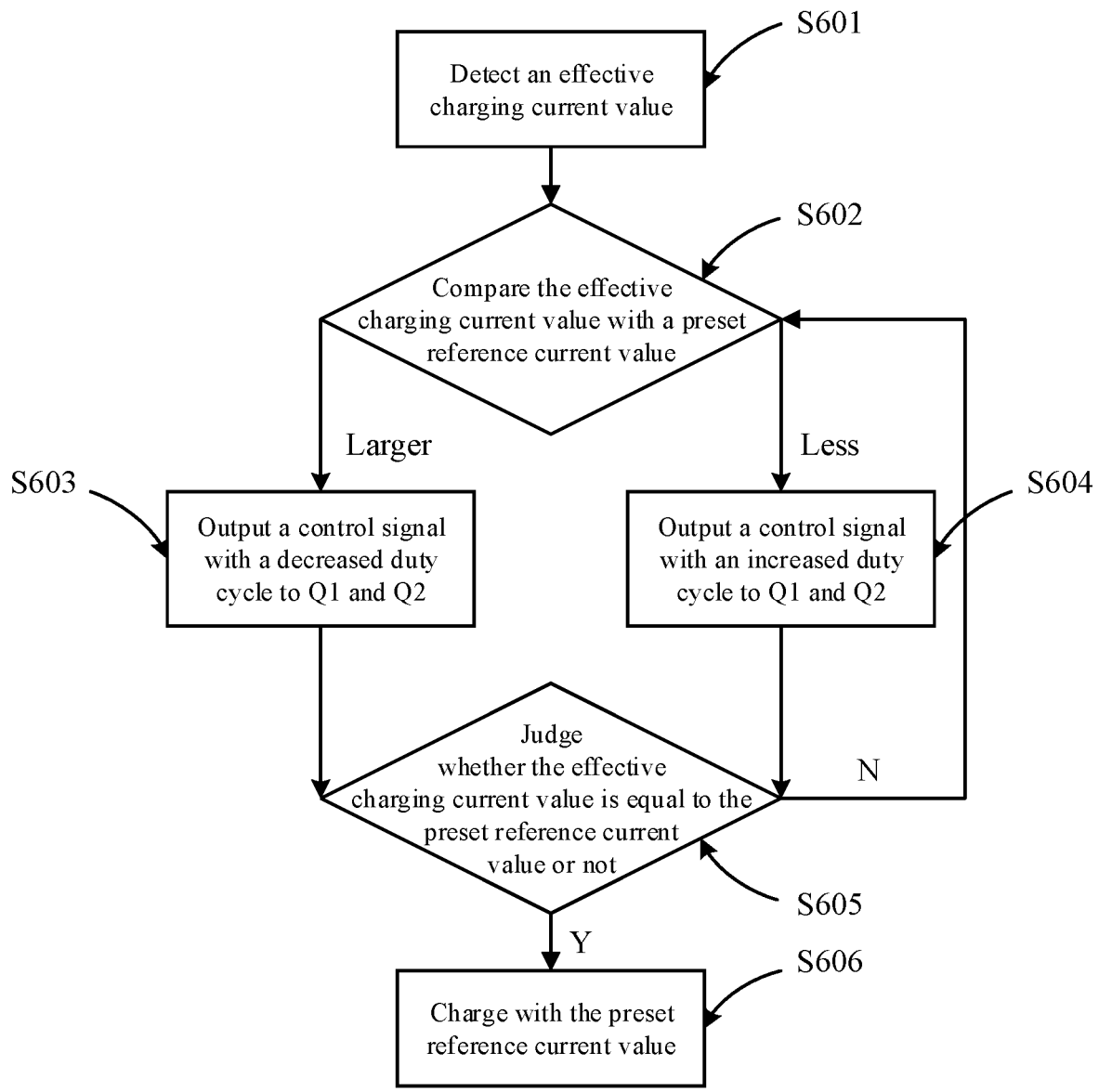
FIG. 6 is a flowchart of an exemplary charging method.

As illustrated in FIG. 6, the charging method for the charging device includes steps described below.

In step S601, an effective charging current value is detected.

In step S602, the effective charging current value is compared with a preset reference current value; when the effective charging current value is larger than the preset reference current value, going to step S603; when the effective charging current value is less than the preset reference current value, going to step S604.

In step S603, a control signal with a decreased duty cycle is output to the first semiconductor switch Q1 and the second semiconductor switch Q2.

In step S604, the control signal with an increased duty cycle is output to the first semiconductor switch Q1 and the second semiconductor switch Q2.

In step S605, it is judged whether the effective charging current value is equal to the preset reference current value or not; when the effective charging current value is equal to the preset reference current value, going to step S606; otherwise, returning to S602;

In step S606, the charging is performed with the preset reference current value.

In step S601, specifically, the sampling frequency of collecting the charging current value of the battery pack by the detection module is 100 HZ. The effective charging current value may be collected by the detection module from the charging device, or may be collected from the battery pack.

In another example, the detection module 180 collects the charging current peak. The controller 170 presets a reference current peak. The controller 170 receives the charging current peak connected by the detection module 180 and compares the charging current peak collected by the detection module 180 with the preset reference current peak to compensate, rectify and output the control signal with a varying duty cycle to the first semiconductor Q1 and the second semiconductor Q2, so as to output the charging current with a value close to the preset reference current peak.

Figure 7:
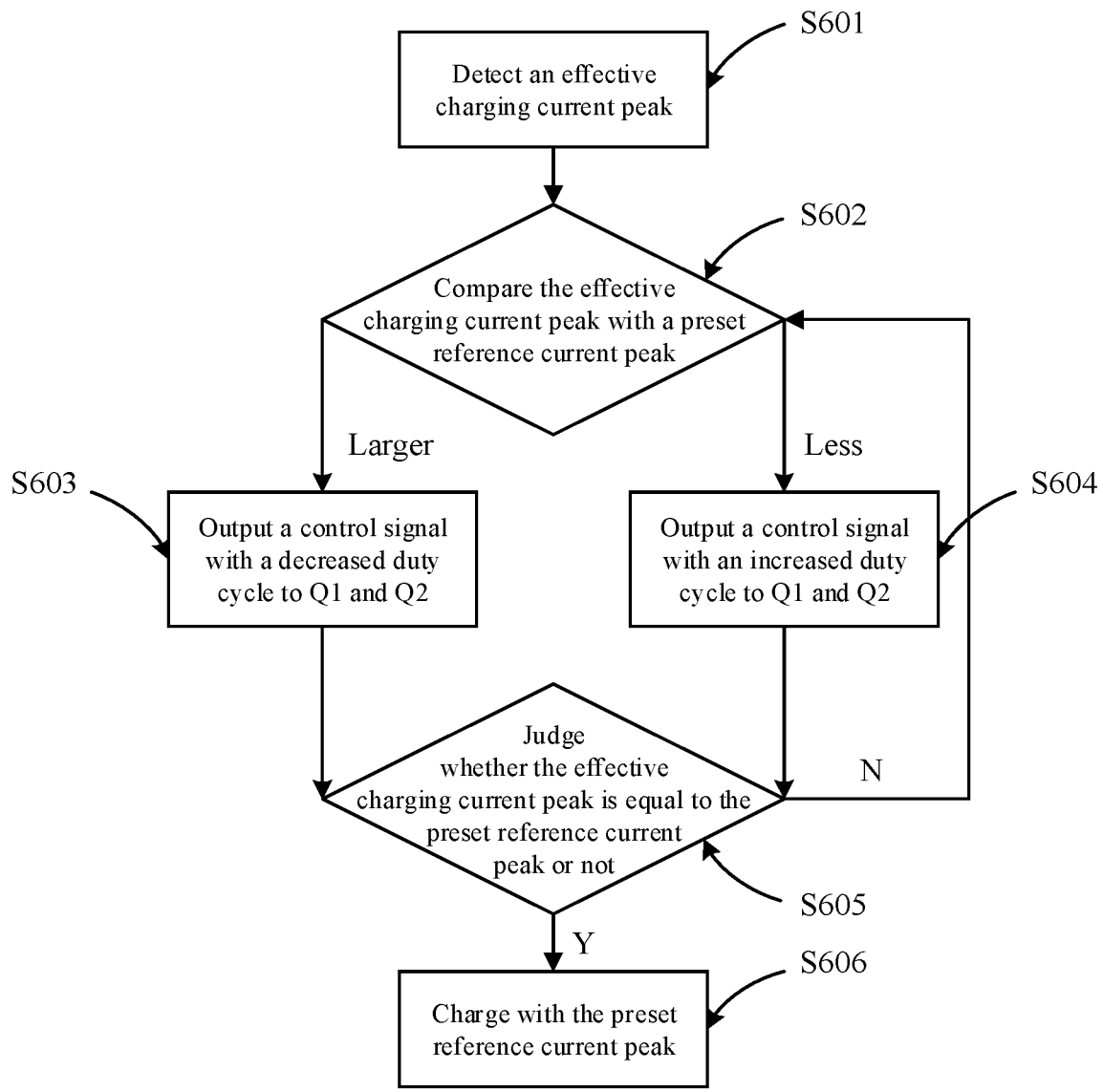
FIG. 7 is a flowchart of a further exemplary charging method.

As illustrated in FIG. 7, another charging method for the charging device includes the steps described below.

In step S701, an effective charging current peak is detected.

In step S702, the effective charging current peak is compared with a preset reference current peak; when the effective charging current peak is larger than the preset reference current peak, going to step S603; when the effective charging current peak is less than the preset reference current peak, going to step S604.

In step S703, a control signal with a decreased duty cycle is output to the first semiconductor switch Q1 and the second semiconductor switch Q2.

In step S704, the control signal with an increased duty cycle is output to the first semiconductor switch Q1 and the second semiconductor switch Q2.

In step S705, it is judged whether the effective charging current peak is equal to the preset reference current peak or not; when the effective charging current peak is equal to the preset reference current peak, going to step S706; otherwise, returning to step S702.

In step S706, the charging is performed with the preset reference peak.

In step S701, specifically, the sampling frequency of collecting the charging current value of the battery pack by the detection module is 50 kHz. The effective charging current peak may be collected by the detection module from the charging device, or may be collected from the battery pack.

The circuit diagram of another charging circuit 220 illustrated in FIG. 4 differs from a charging circuit 120 illustrated in FIG. 4 is that an alternating current voltage conversion circuit 240 includes four semiconductor switches k1, k2, k3 and k4. A second outlet terminal 224 is connected to a second secondary terminal 254. A controller 270 outputs a corresponding control signal for controlling the four semiconductor switches, such that the alternating current voltage conversion circuit 240 converts the unidirectional pulsating direct current to the first alternating current with a preset frequency value.

A charging method for charging the electric energy storage device includes the steps described below.

In step S1, an alternating current power supply is accessed.

In step S2, a current from the alternating current power supply is converted to a first alternating current with a preset frequency value.

In step S3, the first alternating current is converted to a direct current with a fluctuating waveform, so as to charge the electric energy storage device.

In step S2, the alternating current power supply is converted to the first alternating current with a preset frequency by adjusting the duty cycle.

Figure 8:
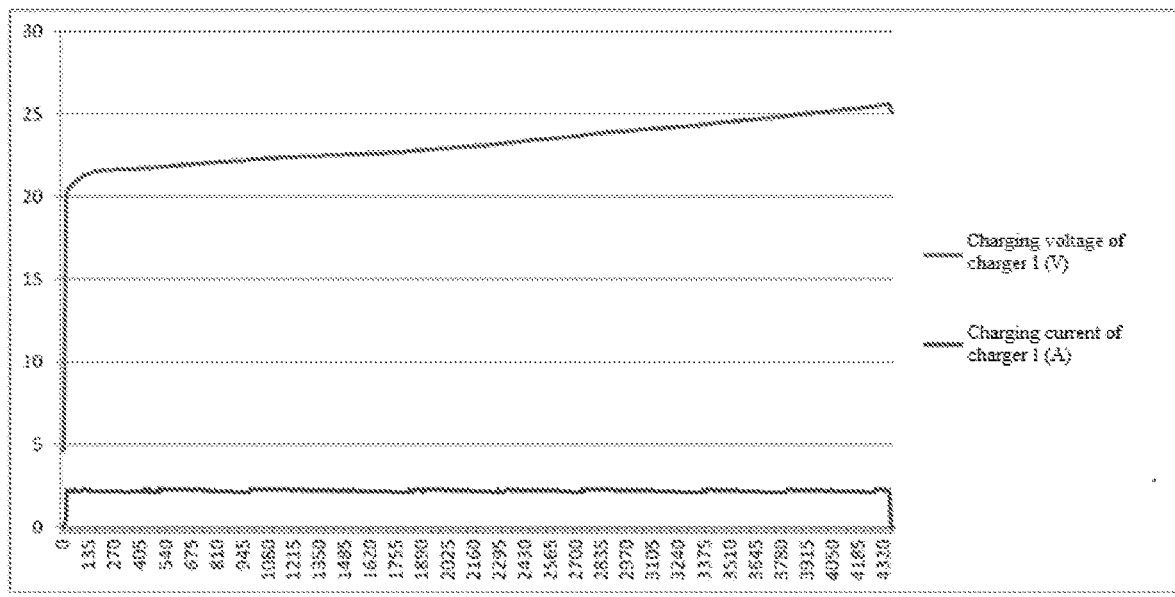
FIG. 8 is a line chart of charging time of an exemplary charging device.

FIG. 8 illustrates a line chart illustrating the charging of the charging device using the above charging circuit and charging method. In the line chart, the horizontal coordinate represents the charging time and the vertical coordinate represents the charging current and charging voltage.

Figure 9:
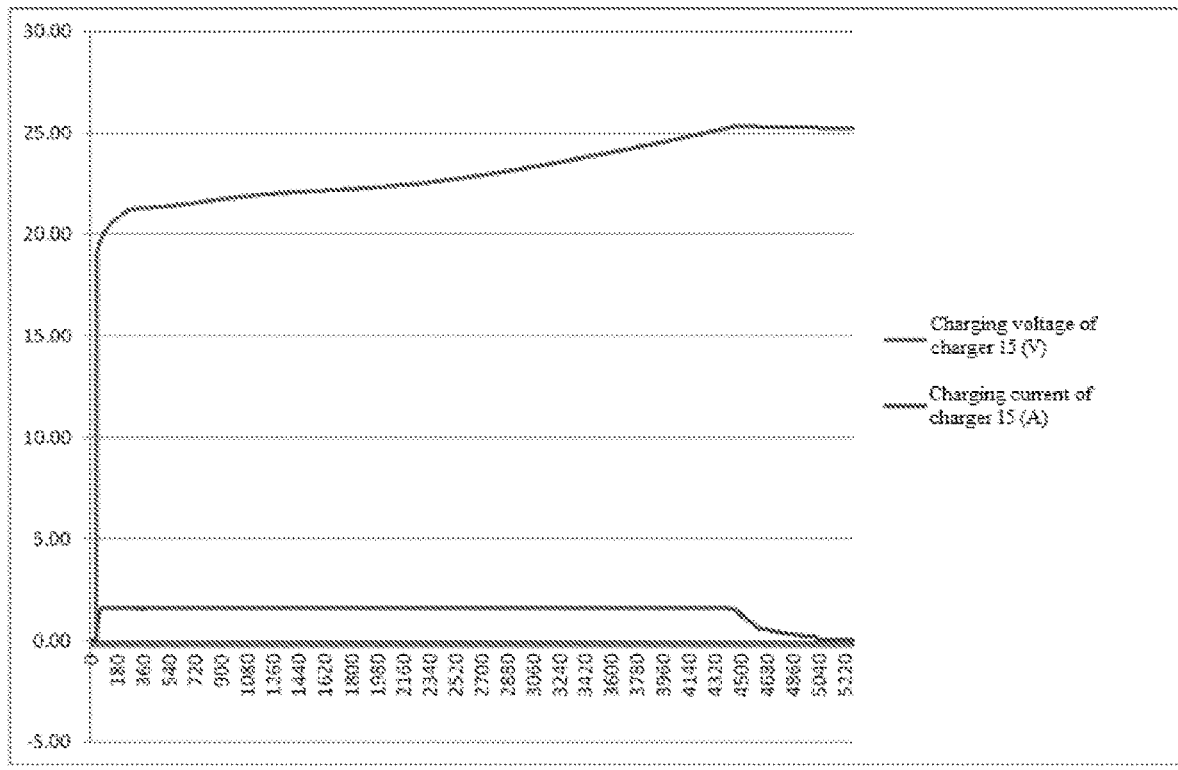
FIG. 9 is a line chart of charging time of an existing charging device.

FIG. 9 illustrates a line chart illustrating the charging of the existing charging device. In the line chart, the horizontal coordinate represents the charging time and the vertical coordinate represents the charging current and charging voltage.

Comparing FIG. 8 with FIG. 9, when charging the charging device of the present disclosure and the existing charging device with a same charging current, the charging time of the charging device of the present disclosure is 4320 s, while the charging time of the existing charging device is 5220 s. As will be apparent, the charging device of the present disclosure has a high charging efficiency.

The above illustrates and describes the basic principle, main features and advantages of the present disclosure. The skilled person in the art should understand that the above embodiments does not limit the present disclosure in any form, and any technical solutions obtained by using equivalent substitution or equivalent transformation are all intended to fall within the protection scope of the present disclosure.

What is claimed is:

1. A charging device for charging an electric energy storage device, comprising:
    a power supply circuit, which is connected to a power supply;
    an alternating current conversion circuit, which is configured to convert a current from the power supply connected to the power supply circuit to a first alternating current with a preset frequency value;
    a capacitor electrically coupled between the power supply circuit and the alternating current conversion circuit;
    a high-frequency transformer, which is configured to convert the first alternating current to a second alternating current, wherein the high-frequency ranges from 5 kHz to 1 MHz and a voltage value corresponding to the second alternating current is less than a voltage value corresponding to the first alternating current; and
    a direct current voltage conversion circuit, which is configured to convert the second alternating current to a direct current with a waveform fluctuating in a preset range, so as to charge the electric energy storage device,
    wherein the alternating current conversion circuit is connected to the power supply circuit, the transformer is connected to the alternating current conversion circuit, and the direct current voltage conversion circuit is connected to the transformer, and
    wherein the capacitor is an electrolytic capacitor and the value range of the electrolytic capacitor (CY) is 330 nF<CY<(0.5*output power) nF, wherein the output power is the output power of the charging device.

2. The charging device according to claim 1, wherein the alternating current conversion circuit comprises a switching arrangement, the switching arrangement is configured to switch on or switch off a connection between the power supply circuit and the alternating current conversion circuit, the charging device further comprises a controller, and the controller is configured to control a frequency of the switch-on and switch-off of the switching arrangement, so as to convert the current from the power supply connected to the power supply circuit to the first alternating current with the preset frequency value.

3. The charging device according to claim 2, further comprising a detection module, which is configured to detect an output current of the direct current voltage conversion circuit, and a controller, which is configured to output a control signal with a constant duty cycle to the switching arrangement when the output current reaches a preset current value.

4. The charging device according to claim 2, further comprising a detection module, which is configured to detect an output current of the direct current voltage conversion circuit, and a controller, which is configured to output a control signal with a varying duty cycle to the switching arrangement according to a variation in the output current, so as to maintain the output current at a preset value.

5. The charging device according to claim 2, wherein the direct current voltage conversion circuit comprises a rectifier unit, which is configured to convert the second alternating current to a pulsating direct current, and a filter circuit, which is configured to convert the pulsating direct current to a smooth direct current, so as to charge the electric energy storage device.

6. The charging device according to claim 2, wherein the alternating current conversion circuit further comprises a switching arrangement, which is configured to switch on a connection between the power supply circuit and the alternating current conversion circuit, and a capacitor, which is configured to constitute a current loop with the switching arrangement and the transformer during the switch-on of the switching arrangement.

7. The charging device according to claim 1, wherein the current from the power supply connected to the power supply circuit is an alternating current.

\* \* \* \* \*